April 18, 1967 C. HOROWITZ 3,314,440
VALVE FOR TIRE STEMS
Filed Oct. 5, 1964
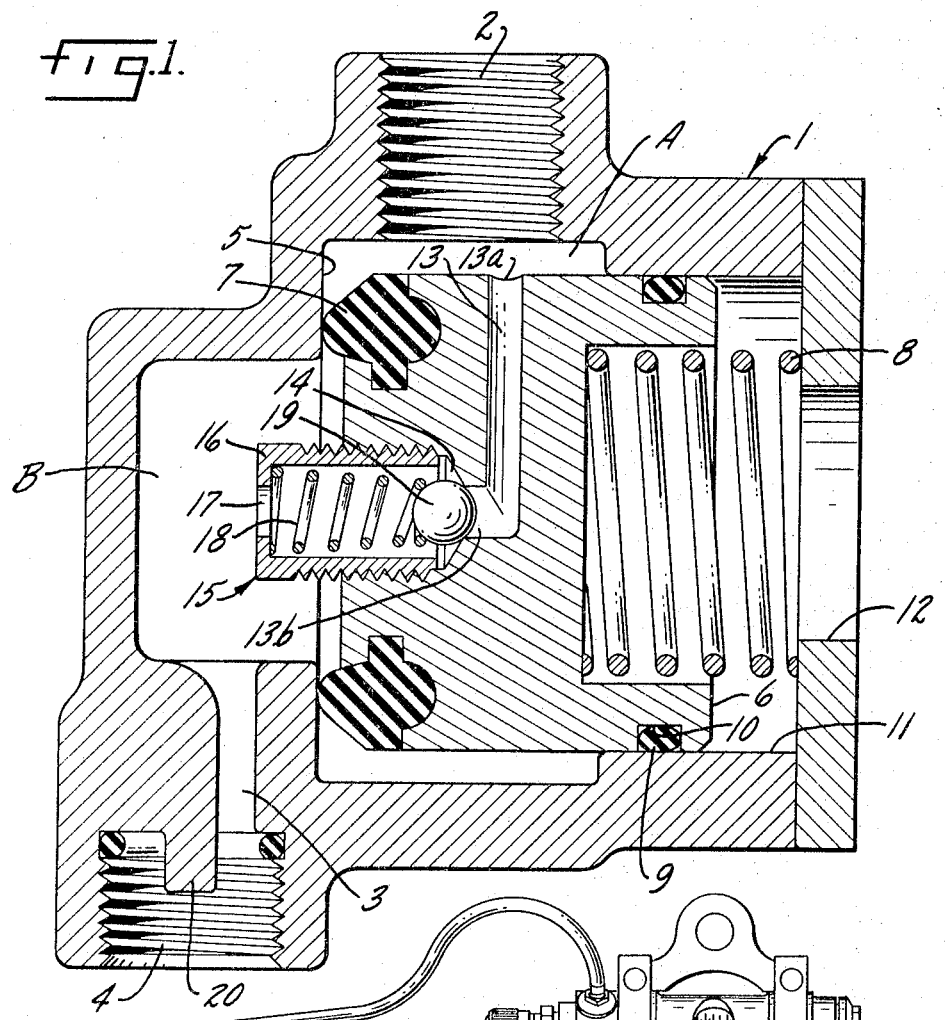
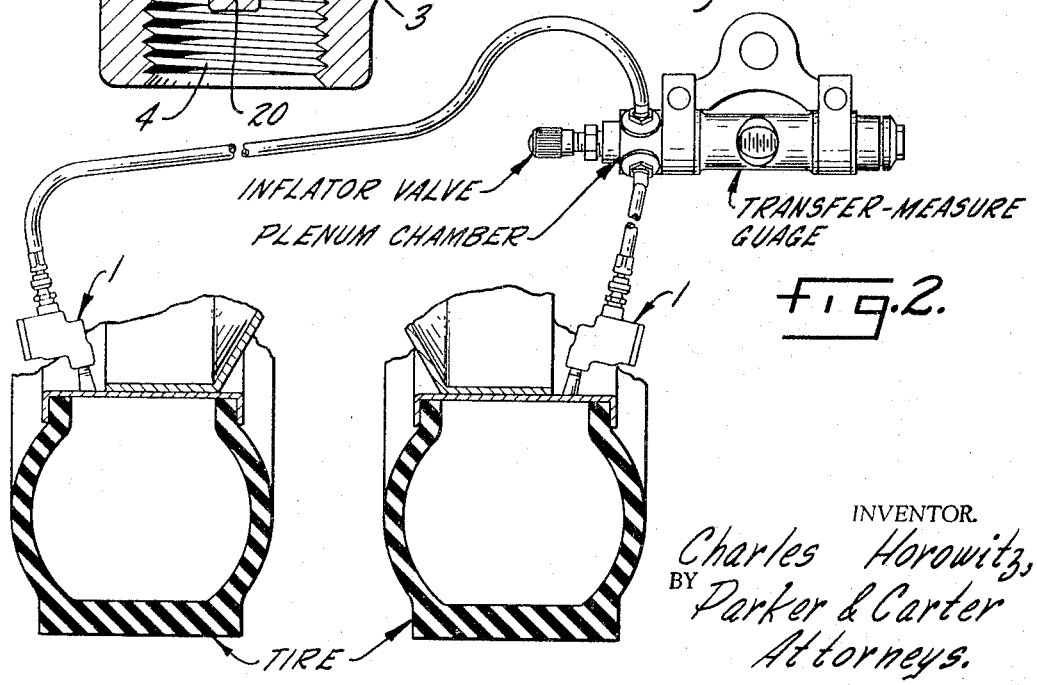
INVENTOR.
Charles Horowitz,
BY Parker & Carter
Attorneys.

United States Patent Office 3,314,440
Patented Apr. 18, 1967

3,314,440
VALVE FOR TIRE STEMS
Charles Horowitz, Skokie, Ill., assignor, by mesne assignments, to Berg Mfg. & Sales Co., Des Plaines, Ill., a corporation of Illinois
Filed Oct. 5, 1964, Ser. No. 401,581
2 Claims. (Cl. 137—226)

This invention relates to valves and has particular relation to a valve usable in association with pneumatic tires such as vehicle tires and the like.

One purpose of the invention is to provide a valve attachable to a tire stem and effective to permit filling of the tire.

Another purpose is to provide a valve effective to hold a tire filler neck valve in open position and to substitute a check valve arrangement therefor.

Another purpose is to provide a valve for pneumatic tires which may be employed with a valve stem from which the conventional stem valve has been removed.

Another purpose is to provide a valve usable with a set of tires and effective to insure balancing of pressure between the tires of said set.

Another purpose is to provide a valve usable with a plurality of tires effective to preclude diminution of pressure in one of said tires below a predetermined value when another of said tires falls below said value.

Another purpose is to provide a valve which may be employed as a filler valve for filling a pneumatic tire and which may retain pressure within said tire above a predetermined level.

Another purpose is to provide a valve usable with a vehicle tire without modification of said tire.

Another purpose is to provide a valve automatically effective to balance pressure between a plurality of tires and to limit automatically the diminution of pressure within one of said tires below a predetermined value.

In conventional truck-trailer combinations it is known to employ a set of dual wheels and tires. It is desirable that said tires be equally inflated so as to wear equally and to provide the smoothest, most balanced ride. Should one of said tires be inflated to a pressure less than the other of said tires, the tire having the greater inflation is required to carry the major, and in some cases the entire load. Similarly, one of said tires may be entirely deflated without the knowledge of the vehicle operator since the remaining tire, being fully inflated, precludes a flattening of the deflated tire visible to the eye. While it is desirable to maintain equalized pressures in both of said tires in said set, it is not desirable to cause an otherwise good tire to become flat in response to the complete deflation of one of said tires. At the same time, it is equally undesirable to permit the fact of deflation of one tire and the resultant disposition of the load on the remaining tire to go unnoticed for any substantial length of time. Accordingly, it is one purpose of the invention to provide a valve structure automatically effective to provide equalization of pressures between adjacent tires in a set of dual tires and, at the same time, to preclude said equalization from producing the entire deflation or draining of an otherwise good tire in response to the complete deflation of its adjacent tire.

Other purposes will appear from time to time during the course of the specification and claims.

The invention is illustrated more or less diagrammatically in the accompanying drawings, wherein:

FIGURE 1 is a side elevation illustrating the valve of the invention; and

FIGURE 2 is a diagrammatic illustration, on a reduced scale, illustrating a system employing the valve of the invention.

Like parts are indicated by like numerals throughout the specification and drawings.

Referring now to FIGURE 1, the numeral 1 designates generally a valve housing. The valve housing 1 has an inwardly threaded inlet passage indicated at 2. The passage 2 communicates with a chamber A within housing 1. An outlet passage 3 communicates with a subchamber B and with an inwardly threaded outlet bore 4. A valve seat 5 is formed within housing 1 at the point of communication between chambers A and B.

Reciprocal within chamber A is a valve piston 6 which carries a valve face 7 for engagement with seat 5. A yielding means, such as spring 8, is positioned within housing 1 to urge piston 6 and valve face 7 toward the valve seat 5. A seal 9 is carried in a circumferential groove 10 formed in the circumferential surface of valve piston 6 for engagement with an inner wall portion 11 of chamber A. Indicated at 12 is a vent to atmosphere for the chamber A on the side of piston 6 and seal 9 opposite that on which valve face 7 is carried.

A filler passage 13 is formed in piston 6 intermediate the valve face 7 and seal 9. One end 13a of passage 13 communicates with inlet 2 through chamber A. The opposite end 13b of passage 13 communicates with a well 14 formed in the end face of piston 6 which carries the valve face 7. Within well 14 a check valve structure, indicated generally by the numeral 15, is positioned and may be threadably secured as shown. The structure 15 includes a fitting 16 communicable with passage 13 and having an outlet 17 in communication with chamber B. A yielding means, such as the spring 18, is positioned within fitting 16 and urges a ball check valve member 19 into position closing the inner end 13b of passage 13 and thus closing communication between fitting 16 and passage 13.

The housing 1 carries an integral finger abutment 20 which extends alongside passage 3 and into the bore 4.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

It will be observed that valve seat 5 is positioned between inlet 2 and outlet passage 3 and that valve face 7 is effective, when engaged with seat 5, to preclude communication between inlet 2 and outlet 3. It will be further observed that passage 13 communicates inlet 2 with outlet 3 when valve face 7 is on seat 5 and check valve 19 is off its seat at 13b.

With the parts as shown in FIGURE 1, spring 8 holds valve face 7 on its seat 5 and spring 18 holds valve member 19 on its seat 13b. With the parts thus positioned, the valve of the invention may be secured to the filler neck of a conventional pneumatic tire, the inwardly threaded bore 4 being formed and adapted for engagement with said neck, the latter being conventionally sized and outwardly threaded.

When the valve of the invention is thus fitted onto the tire, the finger abutment 20 depresses the conventional valve stem of the tire (not shown) and holds it continuously in open position. Since, however, valve face 7 is held on its seat 5 by spring 8 and check valve member 19 is held on its seat 13b by spring 18, the tire is secured against communication with inlet 2 or with atmosphere. The valve stem of the tire may, in fact, be removed when desired, since the check valve structure 15 acts to perform the function of such valve stem.

When air is supplied under pressure to inlet 2, said air enters the end 13a of passage 13 and opens check valve member 19 against the action of spring 18. From thence said air flows through outlet 17 of fitting 16 into chamber B and from chamber B through passage 3 and the filler neck of the tire secured in bore 4 to begin filling of the tire. When the pressure thus flowing into the tire reaches a pressure of a predetermined level, for example say 50 pounds, said pressure in chamber B is sufficient to unseat valve face 7 from seat 5 and thus to move piston 6 against the action of spring 8. Thereafter pressure entering inlet 2 flows through chamber A directly through seat 5 into chamber B and from thence through passage 3 into the tire. Thereafter, so long as the pressure within the tire remains above said predetermined level, piston 6 will remain in retracted position and valve face 7 will remain off seat 5. Since it is conventional to maintain a pressure approximating 90 pounds in the tires to which the invention relates, it will be seen that piston 6 will remain retracted so long as desired conditions obtain.

As shown in FIGURE 2 and the legends thereon, inlet 2 is secured to one end of a suitable conduit, the opposite end of which is secured to the plenum chamber of a suitable pressure transfer and measuring element. For further description of these elements, reference may be had to those disclosed in application, Ser. No. 371,630, filed June 1, 1964, for "Tire Pressure Device." Thus the inlet 2 is in continuous communication through such transfer means and a second conduit with a similar inlet of a similar valve affixed to a second tire. Pressure thus delivered to said transfer member, through an inflator valve such as that shown in FIGURE 2, for example, will thus flow into the inlet 2 illustrated in the drawings herein and to a corresponding inlet in a corresponding valve 1 on a second tire. Thereafter with the vlave faces 7 off their associated seats 5, pressure is present above said predetermined level in both tires and in the transfer conduits and in the valves of the invention. Should the pressure in one tire diminish, it will be clear that pressure from the adjacent tire will flow into the diminished tire to equalize and balance the pressure in the two tires.

If however, pressure should be diminished in one tire below said predetermined level, due to a puncture, blowout or other damage to the injured tire, pressure will flow from the remaining "good" tire down to said predetermined level. Thereupon the valve face 7 associated with said "good" tire will return to its seat 5. The ball check to the good tire will be seated and pressure will thus be valve member 19 of the valve of the invention secured retained in a good tire at said predetermined level.

Thus the valve of the invention is effective to provide filling of the tire with ease since only a small pressure differential, say one or two pounds, is initially required to unseat valve member 19. The tire is gradually filled until 50 pounds is reached, at which point valve seat 5 is opened and the remaining 40 pounds or so is added. Thereafter, the valve, installed in a dual set of tires, will automatically balance the pressures in both tires in response to diminution of pressure in one tire. Should such diminution produce a pressure below a safe level, say 50 pounds, the valves will close automatically and the good tire will provide a safe condition until the vehicle can reach a point of repair, while the diminished pressure will still provide a clear indication to the operator that repairs are needed.

There is claimed:

1. A tire inflation and balancing device for balancing pressure between a pair of vehicle tires above a predetermined value and isolating one tire from another below said predetermined value, comprising a valve including a housing, a first chamber in said housing, a second chamber positioned in said housing for communication with said first chamber, a valve seat between said chambers, an inlet communicating with said first chamber, an outlet configured for mounting of the housing on a conventional tire valve stem and communicating with said second chamber, a valve piston carrying a valve face for seating on said valve seat and yielding means urging said valve face toward said valve seat, a passage through said valve piston for communicating said first chamber with said second chamber, a check valve in said passage yieldingly urged toward a position closing said passage against the flow of pressure from said passage to said second chamber and precluding flow of pressure from said second chamber to said passage, said check valve being opened in response to pressure in said first chamber and passage above a first predetermined value, said valve piston face being movable off said valve seat in response to pressure in said second chamber above a greater predetermined value to open communication between said chambers through said valve seat, said check valve and said valve piston being returned to closed position when pressure in said chambers falls below the value at which said valve face initially moves from said valve seat.

2. For use between a pair of vehicle tires, a tire pressure balancing device comprising a pressure operated valve assembly including a housing provided with an inlet and configured for mounting upon a conventional tire valve stem, a first chamber in said housing, a second chamber positioned in said housing for communication with said first chamber, a valve seat between said chambers, said inlet communicating with said first chamber, an outlet defining the stem mounting means communicating with said second chamber, a valve piston carrying a valve face for seating on said valve seat and yielding means urging said valve face toward said valve seat at one force, a passage through said valve piston for communicating said first chamber with said second chamber, a check valve in said passage yieldingly urged at a lesser force toward a position closing said passage against the flow of pressure from said passage to said second chamber and precluding flow of pressure from said second chamber to said passage, said check valve and said valve piston being biased in opposite directions for movement to their respective closed positions, said check valve being opened in response to pressure in said first chamber and passage above a first predetermined value, said valve piston being opened in response to pressure in said greater chamber above a second predetermined value, said valve piston remaining continuously open in response to continuation of pressure in said second chamber above said greater predetermined value to maintain communication of said chambers through said valve seat, said check valve closing when said valve piston moves toward the open position whereby upon loss of pressure in said first chamber below the predetermined greater value, the valve piston moves to a closed position isolating the second chamber from the first chamber.

References Cited by the Examiner

UNITED STATES PATENTS

| | | | |
|---|---|---|---|
| 807,269 | 12/1905 | Hildebrand | 137—493.3 |
| 1,434,708 | 11/1922 | Kelsey | 137—226 |
| 1,488,813 | 4/1924 | Hagen et al. | 137—226 |
| 1,882,455 | 10/1932 | Spicer | 152—415 X |

FOREIGN PATENTS 538,813    1922    France.

WILLIAM F. O'DEA, *Primary Examiner.*

ISADOR WEIL, *Examiner.*

D. LAMBERT, *Assistant Examiner.*